Figure 7:
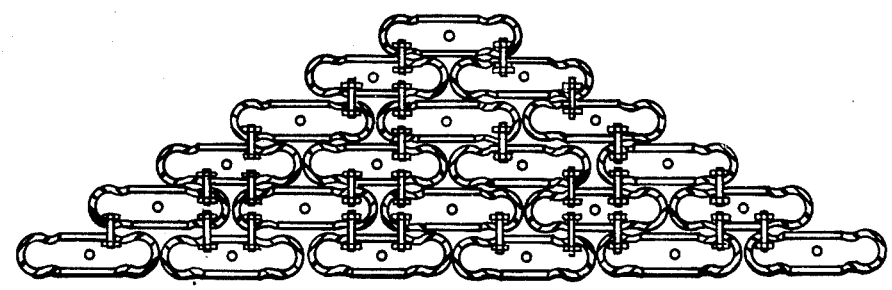

United States Patent [19]  [11]  4,188,153
Taylor  [45]  Feb. 12, 1980

[54] FORMATION OF BARRIERS

[76] Inventor: John E. Taylor, "Telford", Over, Gloucester, England

[21] Appl. No.: 782,052

[22] Filed: Mar. 28, 1977

[51] Int. Cl.² .............................................. E02B 3/12
[52] U.S. Cl. ........................................ 405/34; 405/30
[58] Field of Search ........................................ 61/3–5, 61/37, 38; 52/155

[56] References Cited

U.S. PATENT DOCUMENTS

| 3,176,468 | 4/1965 | Nagai et al. | 61/37 X |
| 3,374,635 | 3/1968 | Crandall | 61/38 |
| 3,507,121 | 4/1970 | Morfeldt | 52/155 X |
| 3,570,254 | 3/1971 | Turzillo | 61/38 |
| 4,080,793 | 3/1978 | Pulsifer | 61/37 |

FOREIGN PATENT DOCUMENTS

| 1398975 | 4/1965 | France | 61/3 |
| 992216 | 5/1965 | United Kingdom | 61/3 |

OTHER PUBLICATIONS

The Star–Democrat, Mar. 13, 1974, p. 8A.
The Evening Sun, Apr. 9, 1974, Section C.

Primary Examiner—Dennis L. Taylor
Attorney, Agent, or Firm—Young & Thompson

[57] ABSTRACT

An erosion-preventing structure for use in strengthening a river bank or in desert reclamation is formed from a stack of toroidal objects such as used vehicle tires. The toroidal objects are disposed in a plurality of relatively offset layers which are held against relative movement and adjacent tires in a layer are secured together.

2 Claims, 9 Drawing Figures

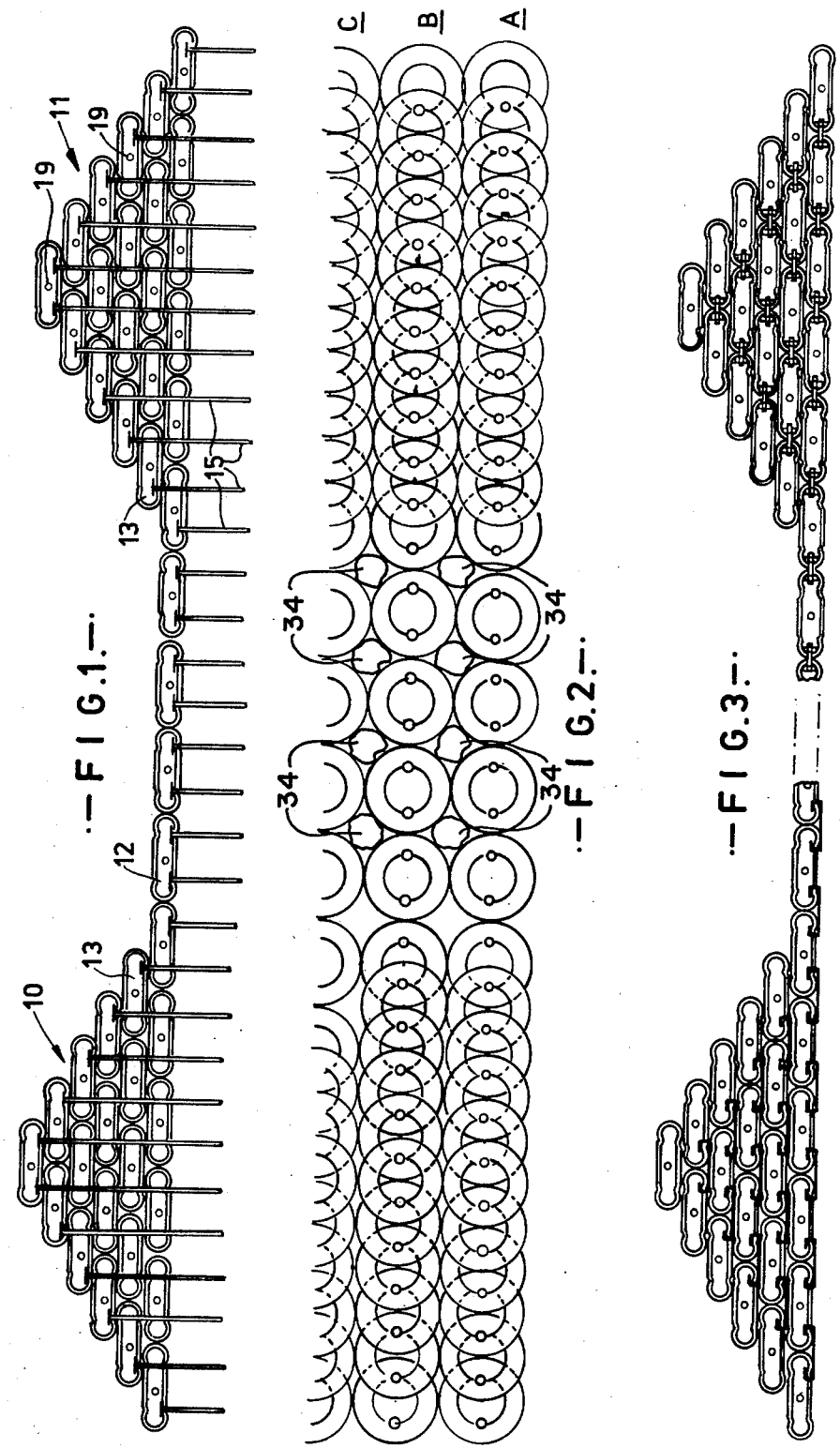

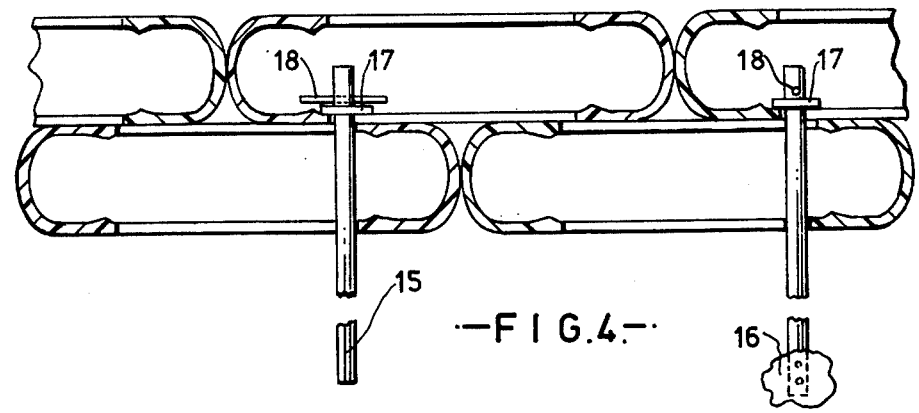
—FIG.4.—
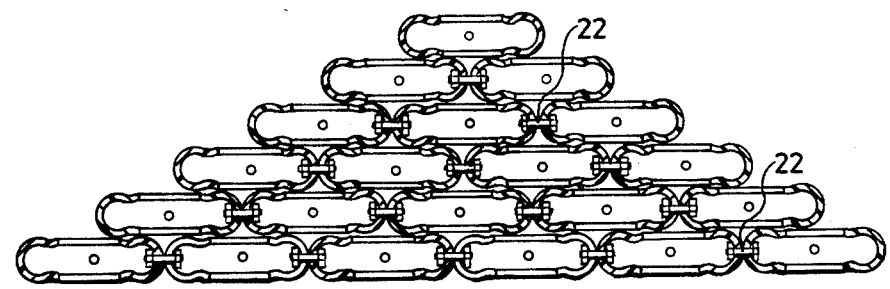
—FIG.5.—
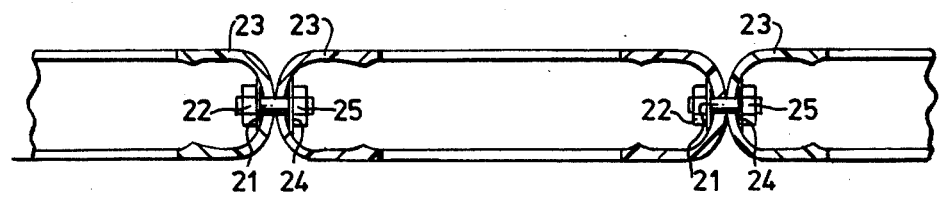
—FIG.6.—

FORMATION OF BARRIERS

This invention relates to the formation of barriers for use, for example, as strengthening means for the sides of rivers, canals and dykes, as dams or weirs, or as erosion-preventing structures of general application. The invention is thus applicable to the construction of roadways across deserts and to desert reclamation.

According to one aspect of the invention there is provided a method of forming a barrier which comprises assembling a stack of generally toroidal objects which are disposed in a plurality of relatively offset layers, securing together adjacent objects of a layer and providing means preventing relative movement between adjacent layers.

The generally toroidal objects may be used tyres from lorries, tractors, cars or other motor vehicles, scrap tyres constituting a source of low-cost, readily available material in respect of which there is at present a disposal problem so that the invention not only provides an efficient method of barrier formation but has additional ecological advantages in that it provides for the useful disposition of a potential source of pollution.

According to a second aspect of the invention there is thus provided a barrier which consists of a stack of motor vehicle tyres which are disposed in a plurality of relatively offset layers, adjacent tyres of a layer being secured together and means being provided for preventing relative movement between adjacent layers.

Each layer of the stack of tyres may consist of a plurality of rows with the rows in superposed layers disposed in register but with the tyres in any one row offset relatively to the tyres in the rows above and beneath that one row. The dimensions of used vehicle tyres are normally such that, when a stack is formed in the manner set out above, a series of lenticular spaces are afforded by the overlapping tyres of the different layers. Relative movement between adjacent layers of the stack may thus be prevented by driving stakes through the lenticular spaces into the ground or other supporting surface on which the stack is formed.

In order to assist in location of the stack, the stakes may be of tubular form and concrete may be forced under pressure down each tube so as to form a concrete anchorage at the bottom of each stake. Alternative means of preventing relative movement between adjacent layers of a stack may, of course, be adopted, for example, vertically adjacent tyres may be bolted together.

Figure 8:
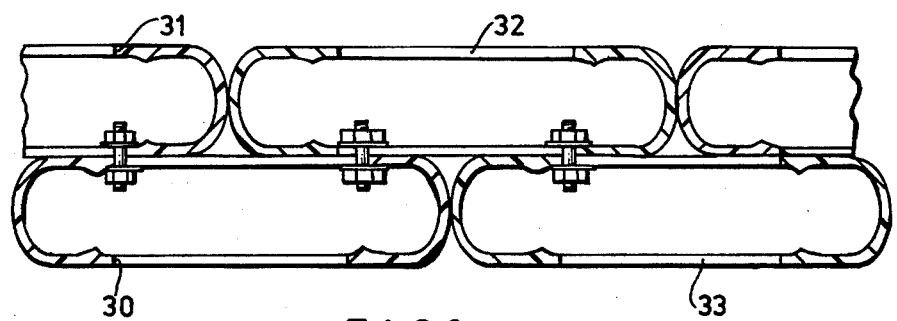
Figure 9:
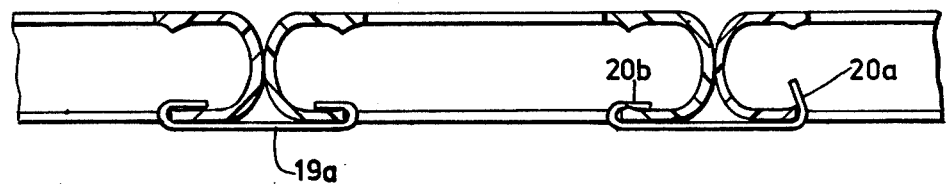

The invention will now be described by way of example with reference to the accompanying drawings in which:

FIG. 1 is a transverse sectional view of a barrage formed from a plurality of used vehicle tyres, FIG. 2 is a plan view of the barrage of FIG. 1, FIG. 3 is a view similar to FIG. 1 but illustrating two alternative methods of securing the tyres together, FIG. 4 is a detail of FIG. 1, FIG. 5 illustrates an alternative barrier construction, FIG. 6 is a detail of FIG. 5, FIG. 7 illustrates a further barrier construction, FIG. 8 is a detail of FIG. 7, and FIG. 9 is a detail of the left-hand side of FIG. 3.

Referring first to FIGS. 1 and 2, these illustrate the formation of a barrage consisting of two spaced barriers 10 and 11 the space between which can be filled in by means of an aggregate to provide a roadway. A first layer 12 of lorry tyres is formed which consists of a plurality of parallel rows A, B, C, etc. extending at right angles to the longitudinal axis of the barrage. Adjacent tyres are clipped or otherwise fastened together by any of the methods hereinafter described; a second layer 13 of tyres is placed on top of the first layer and adjacent tyres of the second layer 13 are again clipped or otherwise fastened together. It is to be noted that, although the first layer of tyres is continuous, the second layer 13 includes two separate spaced portions so that, as the requisite number of layers is assembled, the two spaced barriers 10 and 11 are formed.

The tyres of each layer 12, 13, etc. are in parallel rows as can be seen from FIG. 2 with the rows disposed one on top of the other. The inwardly and outwardly facing surfaces of each barrier 10, 11 are inclined to the horizontal and this is achieved by commencing each layer of the stack inset by half the diameter of a tyre relative to the previous layer so that, as the number of layers in each barrier 10, 11 is increased, the number of tyres in each layer is correspondingly reduced by one and adjacent layers are offset. Once the rows of tyres have been assembled in offset layers, the assembled stack is staked by driving hollow tubular rods 15 into the lenticular spaces afforded by the overlaps between the tyres.

After the hollow tubular rods 15 have been driven into the ground, concrete is forced under pressure down the rods so as to emerge from the lower ends thereof and provide concrete blooms 16 which ensure firm anchorage of the rods 15. A plate 17 is fitted over the upper end of each rod 15, as illustrated in FIG. 4, between the two tread surfaces of a tyre and is held in position by means of a pin 18 driven through an aperture in the rod 15.

The barrage may be located alongside a tidal flow so that, in use, mud and silt is deposited in the crevices of the stack and, if the tyres are of open construction, fills the interiors of the tyres. Alternatively, the tyres may be filled with earth before the stack is assembled and openings 19 may be formed in the tyres to assist entry of silt, mud and the like. The deposited mud and silt is retained when the tide recedes so that, even if the tyres were not initially filled with soil, an earthwork barrage held together by rubber tyres is eventually produced.

FIG. 3 illustrates two methods of fixing together adjacent tyres, the method shown on the left-hand side of FIG. 3 being illustrated to an enlarged scale in FIG. 9. The clip system shown in FIG. 9 includes the use of metal strips 19 the ends of which are hooked over the walls of adjacent tyres and then crimping is effected to move the strip end portions from the position indicated at 20a to the position indicated at 20b so as to secure the tyres firmly together.

The method of attaching adjacent tyres together illustrated on the right-hand side of FIG. 3 and also in FIGS. 5 and 6, involves the use of bolts passed through apertures in the treads of the tyres. As shown in FIG. 6, a washer 21 is disposed between the head of the bolt 22 and the tread 23 of one tyre whilst a further washer 24 is disposed between a nut 25 tightened on to the shank of the bolt 22 and the tread 23 of the adjacent tyre. The stacks shown in FIGS. 3, 5 and 6 are staked and adjacent layers secured together by means of hollow posts in the manner described above in relation to FIGS. 1, 2 and 4.

On the other hand, the method of attaching the tyres together shown in FIGS. 7 and 8 involves bolting together two tyres in different layers of the stack with the arrangement such that the degree of bolting prevents movement between adjacent tyres in a layer. Thus (see FIG. 8) a tyre 30 in the lower layer is bolted to two tyres 31 and 32 in the upper layer and tyre 32 is additionally bolted to tyre 33 in the lower layer. Movement of the tyre 33 relative to tyre 30 is thus prevented by virtue of the fact that tyre 30 is bolted to both these tyres.

Regardless of the particular method by which the stack of tyres is formed and on whether the tyres are initially filled with sand or soil, the stack of tyres provides an erosion-resistant barrier which is resistant to water erosion and can thus be used to reinforce a river bank or is resistant to wind erosion and can therefore be used in desert reclamation work.

In the construction of a barrage for a bank of a river, the tyres may either be filled with soil before formation of the stack or allowed to fill with silt in situ. In addition, in order to reduce the formation of eddy currents, the spaces between adjacent tyres in a layer may be filled with plastics bags 34 (see FIG. 2) containing mud or silt.

What is claimed is:

1. A method of ground surface stabilization, comprising cutting holes through the tread portion of motor vehicle tyres, stacking the tyres to form a barrier, commencing with a base layer of tyres disposed edge to edge in rows transverse to the length of the barrier and superposing layers of tyres in rows in register with the rows of the base layer but offset to make a staggered formation in which each tyre laps two overlying tyres and two underlying tyres and securing together the tyres of superposed rows, and securing the tyres together and to the subjacent ground, the barrier thus formed being a stable cellular structure to be filled with earth, silt or driven sand.

2. A method according to claim 1, including the steps of placing soil-filled plastics bags in the spaces between adjacent tyres.

* * * * *

UNITED STATES PATENT AND TRADEMARK OFFICE
CERTIFICATE OF CORRECTION

PATENT NO. : 4,188,153
DATED : February 12, 1980
INVENTOR(S) : John Ewin Taylor

It is certified that error appears in the above—identified patent and that said Letters Patent is hereby corrected as shown below:

On the cover sheet insert Priority Data:

-- March 31, 1976  (GB)  United Kingdon  12860/76 --.

Signed and Sealed this

Eighth Day of July 1980

[SEAL]

*Attest:*

SIDNEY A. DIAMOND

*Attesting Officer*  *Commissioner of Patents and Trademarks*